United States Patent
Yang et al.

(10) Patent No.: US 11,495,825 B2
(45) Date of Patent: Nov. 8, 2022

(54) CONTACT SURFACE ADJUSTING MATERIAL FOR SOLID ELECTROLYTES AND COMPOSITE ELECTROLYTE SYSTEM THEREOF

(71) Applicants: PROLOGIUM TECHNOLOGY CO., LTD., Taoyuan (TW); Prologium Holding Inc., Grand Cayman (KY)

(72) Inventors: Szu-Nan Yang, Taoyuan (TW); Dmitry Belov, Taoyuan (TW)

(73) Assignees: PROLOGIUM TECHNOLOGY CO., LTD., Taoyuan (TW); Prologium Holding Inc., Grand Cayman (KY)

( * ) Notice: Subject to any disclaimer, the term of this patent is extended or adjusted under 35 U.S.C. 154(b) by 219 days.

(21) Appl. No.: 17/036,925

(22) Filed: Sep. 29, 2020

(65) Prior Publication Data

US 2021/0119245 A1  Apr. 22, 2021

(30) Foreign Application Priority Data

Oct. 22, 2019  (TW) .................................. 108138054

(51) Int. Cl.
*H01M 10/00*  (2006.01)
*H01M 10/056*  (2010.01)

(52) U.S. Cl.
CPC .. *H01M 10/056* (2013.01); *H01M 2300/0068* (2013.01); *H01M 2300/0082* (2013.01); *H01M 2300/0091* (2013.01)

(58) Field of Classification Search
CPC ............. H01M 50/443; H01M 10/054; H01M 2300/0082; H01M 10/052; H01M 50/446; H01M 2300/0068
See application file for complete search history.

(56) References Cited

U.S. PATENT DOCUMENTS

2017/0298682 A1*  10/2017  Wang .................... C03C 17/366

\* cited by examiner

*Primary Examiner* — Cynthia H Kelly
*Assistant Examiner* — Monique M Wills
(74) *Attorney, Agent, or Firm* — Rabin & Berdo, P.C.

(57) ABSTRACT

The invention provides a contact surface adjusting material for solid electrolytes and composite electrolyte system thereof. The contact surface adjusting material is mainly composed of a polymer base material, which is capable of allowing metal ions to move inside the material, and an additive, which is capable of dissociating metal salts and is served as a plasticizer. The contact surface adjusting material is applied to a surface of the solid electrolytes to construct a face-to-face transmission mode. Therefore, the problems of the high resistances caused by the directly contact of the solid electrolytes are eliminated.

18 Claims, 12 Drawing Sheets

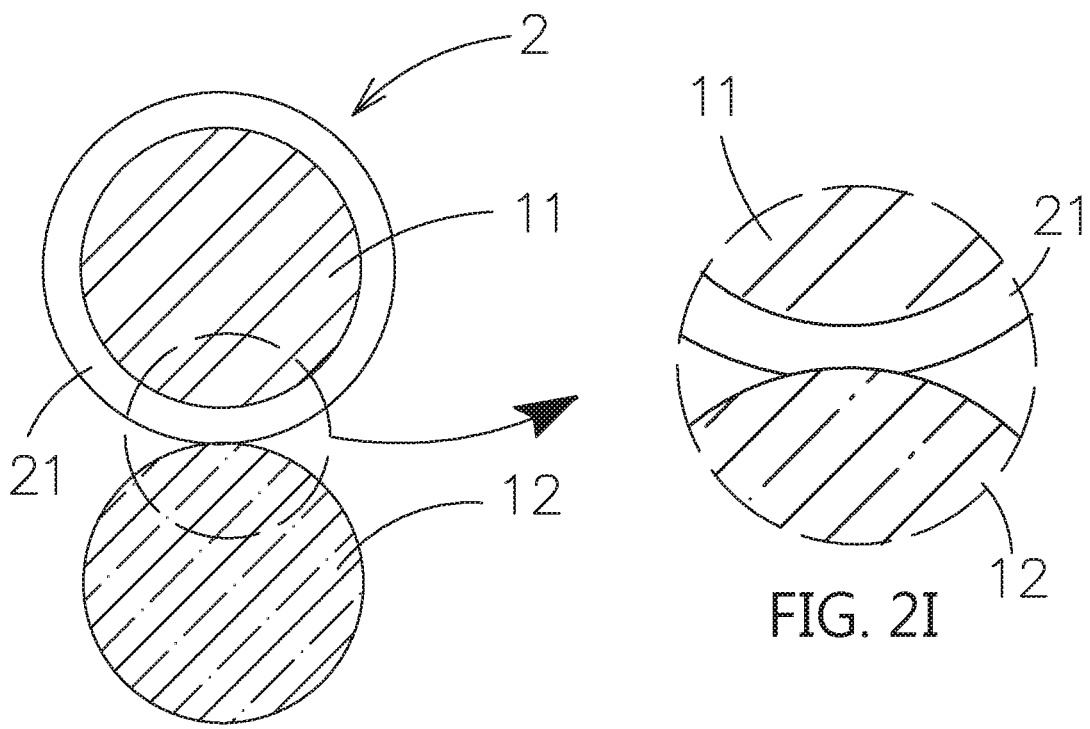
FIG. 2A
FIG. 2I
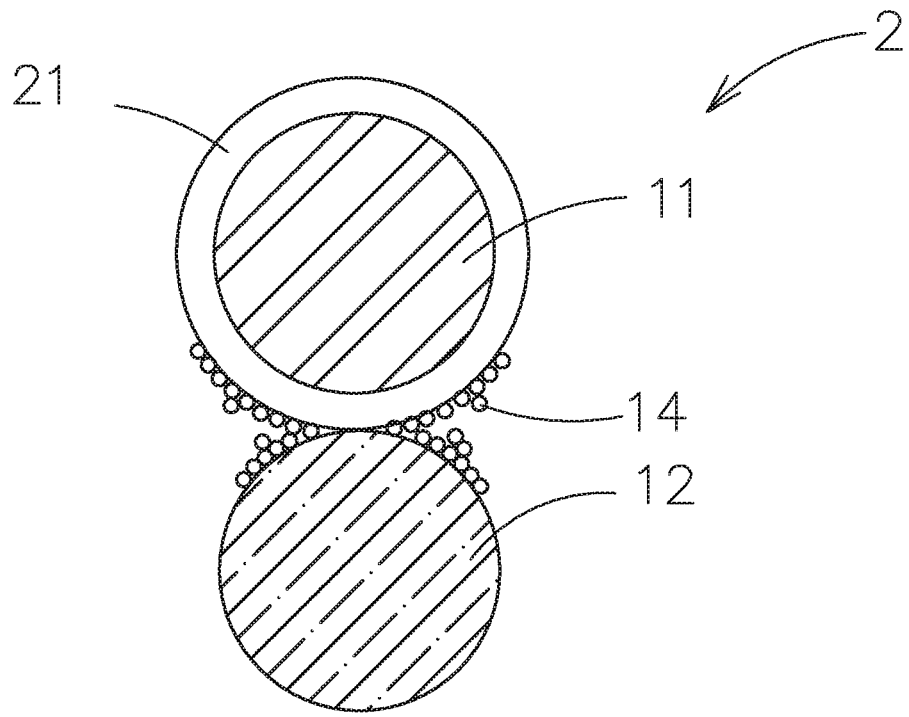
FIG. 2B

CONTACT SURFACE ADJUSTING MATERIAL FOR SOLID ELECTROLYTES AND COMPOSITE ELECTROLYTE SYSTEM THEREOF

CROSS REFERENCES TO RELATED APPLICATIONS

The present application claims priority to Taiwanese Patent Application 108138054 filed in the Taiwanese Patent Office on Oct. 22, 2019, the entire contents of which is being incorporated herein by reference.

BACKGROUND OF THE INVENTION

Field of Invention

The present invention relates to an electrolyte of an electrochemical system layer structure, in particular to a contact surface adjusting material for solid electrolytes and the composite electrolyte system thereof.

Related Art

In the era of energy crisis and energy revolution, secondary chemical energy plays a very important role, especially metal ion batteries with high specific energy and specific power, such as sodium-ion batteries, aluminum-ion batteries, magnesium-ion batteries or lithium-ion batteries. These batteries are applied in information and consumer electronics products, and has recently expanded to the field of transportation energy.

The well-known electrolyte systems in secondary chemical energy are liquid electrolyte systems and solid electrolyte systems. The above-mentioned solid electrolyte systems include the inorganic electrolytes and the organic polymer electrolytes. In order to comply with battery systems with working voltages up to 3-4V, such as lithium-ion batteries, in the liquid electrolyte system the use of water as a solvent is eliminated, but the organic solvents and the electrolyte salts, which are not easily decomposed under high voltage, are used as the main compositions. However, these organic solvents are flammable and volatile, and may cause the battery leakage to lead explosions and fires. Under safety considerations, the composition of the electrolyte system is changed from a liquid electrolyte to a solid electrolyte system with higher safety, especially in the inorganic solid electrolyte systems with high thermal stability, such as oxide solid electrolytes.

However, the non-deformable characteristic of the oxide solid electrolytes would be incurred some problems in application. For example, the interface between the oxide solid electrolytes or between the oxide solid electrolytes and the active material of the electrode layer is mainly point-to-point contact. The contact between the liquid electrolyte or the gel electrolyte and another material is the surface-to-surface or the approximate impregnation coating type. Therefore, the high interface resistance becomes one of the major drawback for the oxide solid electrolyte in the secondary chemical energy.

Therefore, the invention provides a contact surface adjusting material for solid electrolytes and composite electrolyte system thereof to solve the above problems.

SUMMARY OF THE INVENTION

It is an objective of this invention to provide a contact surface adjusting material for solid electrolytes and composite electrolyte system thereof to overcome the problems of the high interface resistance of the inorganic solid electrolyte.

In order to implement the abovementioned, this invention discloses a contact surface adjusting material for solid electrolytes, adapted for an electrochemical system. The contact surface adjusting material includes a polymer base material and an additive mixed together therein. The polymer base material is capable of allowing metal ions to move inside, and the additive is capable of dissociating metal salts and served as a plasticizer.

The invention further provides a composite electrolyte system with the above contact surface adjusting material. The composite electrolyte system includes a first particle, which is a first inorganic solid electrolyte, a second particle, which is selected from a second inorganic solid electrolyte, a passive ceramic material or an active material, and a bridging portion located between the first particle and the second particle and composed of the contact surface adjusting material for solid electrolytes is used to adhere the first particle and the second particle to form an ion transmission path.

The invention further provides a composite electrolyte system with the above contact surface adjusting material. The composite electrolyte system includes a first particle, which is a first inorganic solid electrolyte, a second particle, which is selected from a second inorganic solid electrolyte, a passive ceramic material or an active material and a first shell layer, which covers an outer surface of the first particle. The first shell layer composed of the contact surface adjusting material for solid electrolytes is used to adhere the first particle and the second particle to form an ion transmission path.

BRIEF DESCRIPTION OF THE DRAWINGS

The present invention will become more fully understood from the detailed description given hereinbelow illustration only, and thus are not limitative of the present invention, and wherein:

FIGS. 2A-2H are schematic diagrams of the different embodiments of the composite electrolyte system of this invention.

FIG. 2I is a partial enlarged view of FIG. 2A.

DETAILED DESCRIPTION OF THE INVENTION

Figure 1A:
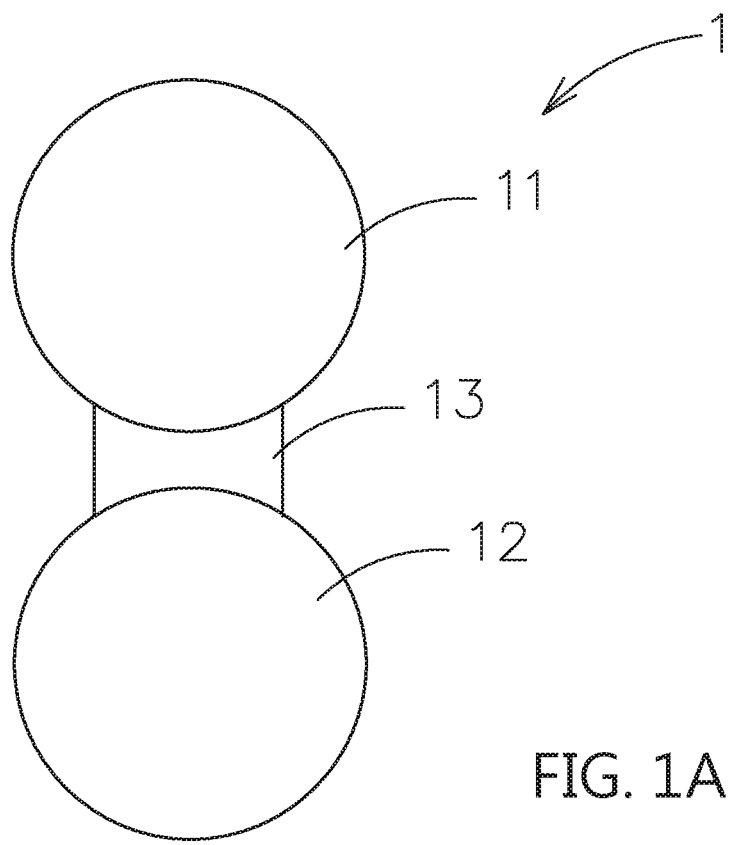
FIG. 1A is a schematic diagram of the composite electrolyte system constructed by the contact surface adjusting material for solid electrolytes of this invention.

The present invention will be described with respect to particular embodiments and with reference to certain drawings but the invention is not limited thereto but only by the claims Any reference signs in the claims shall not be construed as limiting the scope. The drawings described are only schematic and are non-limiting. In the drawings, the size of some of the elements may be exaggerated and not drawn on scale for illustrative purposes.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the description of the present invention, it should be noted that the terms "installation", "connected", and "disposed" are to be understood broadly, and may be fixed or detachable, for example, can be mechanical or electrical, can be connected directly or indirectly, through an intermediate medium, which can be the internal connection between two components. The specific meanings of the above terms in the present invention can be understood in the specific circumstances by those skilled in the art.

Firstly, the contact surface adjusting material for solid electrolytes of this invention mainly includes a polymer base material and an additive mixed together therein. The polymer base material is capable of allowing metal ions, such as lithium ions, to move inside, and the additive is capable of dissociating metal salts, such as lithium salts, and is served as a plasticizer. Also, the contact surface adjusting material further includes an ion supplying material and a crystal growth inhibiting material. In the following description, the metal ions are presented as the lithium ions, and the metal salts are presented as the lithium salts.

The aforementioned polymer base material that allows lithium ions to move inside the material refers to a material that does not have lithium ions by itself (in the state of raw materials or at the beginning of the electrochemical reaction), but can transfer lithium ions. For example, the polymer base material may be a linear structural material without containing salts, such as a polyethylene oxide (PEO). Or in addition to be able to transfer lithium ions, it is also a material that can increase the mechanical strength of the film-forming due to its cross-linked structure, such as a poly(ethylene glycol)diacrylate (PEGDA), a poly(ethylene glycol)dimethacrylate (PEGDMA), a poly(ethylene glycol) monomethylether (PEGME), a poly(ethylene glycol) dimethylether (PEGDME), a poly[ethylene oxide-co-2-(2-methoxyethoxy)ethyl glycidyl ether] (PEO/MEEGE), a hyperbranched polymer, such as a poly[bis(triethylene glycol)benzoate], or a polynitrile, such as a polyacrylonitrile (PAN), a poly(methacrylonitrile) (PMAN) or a poly(N-2-cyanoethyl)ethyleneamine) (PCEEI).

The crystal growth inhibiting material is selected from the material for decreasing in crystallinity, such as a poly(ethyl methacrylate) (PEMA), a poly(methyl methacrylate) (PMMA), a poly(oxyethylene), a poly (cyanoacrylate) (PCA), a polyethylene glycol (PEG), a poly(vinyl alcohol) (PVA), a polyvinyl butyral (PVB), a poly(vinyl chloride) (PVC), a PVC-PEMA, a PEO-PMMA, a poly(acrylonitrile-co-methyl methacrylate) P(AN-co-MMA), a PVA-PVdF, a PAN-PVA, a PVC-PEMA, a polycarbonates, such as a poly(ethylene oxide-co-ethylene carbonate) (PEOEC), a polyhedral oligomeric silsesquioxane (POSS), a polyethylene carbonate (PEC), a poly (propylene carbonate) (PPC), a poly(ethyl glycidyl ether carbonate) (P(Et-GEC), or a poly (t-butyl glycidyl ether carbonate) P(tBu-GEC), a cyclic carbonates, such as a poly (trimethylene carbonate) (PTMC), a polysiloxane-based, such as a polydimethylsiloxane (PDMS), a poly(dimethyl siloxane-co-ethylene oxide) P(DMS-co-EO), or a poly(siloxane-g-ethyleneoxide), a polyesters, such as an ethylene adipate, an ethylene succinate, or an ethylene malonate. Further, the crystal growth inhibiting materialmay be a poly(vinylidenedifluoridehexafluoropropylene) (PvdF-HFP), a poly(vinylidenedifluoride) (PvdF), or a poly(ε-caprolactone) (PCL).

The additive, which is capable of dissociating metal salts, such as lithium salts, and is served as a plasticizer, may be selected from a plastic crystal electrolytes (PCEs), such as a Succinonitrile (SN) [ETPTA/SN; PEO/SN; PAN/PVA-CN/SN], a N-ethyl-N-methylpyrrolidinium, [C2mpyr]+Anions N,N-diethyl-pyrrolidinium, [C2Epyr], a quaternary alkylammonium, a n-alkyltrimethylphosphonium, [P1,1,1,n], a decamethylferro-cenium, [Fe(C5Me5)2], a 1-(N, N-dimethylammonium)-2-(ammonium)ethane triflate ([DMEDAH2][Tf]2), an anions=[FSI], [FSA], [CFSA], [BETA], a LiSi$(CH_3)_3(SO_4)$, or a trimethy(lithium trimethylsilyl sulfate), or an ionic liquid, which may select from an imidazolium, such as an anion/bis(trifluoromethanesulfonyl)imide, an anion/bis (fluorosulfonyl)imide, or an anion/trifluoromethanesulfonate, or an ammonium, such as an anion/bis(trifluoromethanesulfonyl)imide, or a pyrrolidinium, such as an anion/Bis(trifluoromethanesulfonyl)imide, an anion/bis (fluorosulfonyl)imide, or a piperidinium, such as an anion/bis(trifluoromethanesulfonyl)imide, an anion/bis(fluorosulfonyl)imide.

The ion supplying material may be a lithium salt, such as a LiTFSI, a LiFSI, a $LiBF_4$, or a $LiPF_6$.

Moreover, the contact surface adjusting material further includes a second dopant with nanometer scale, the second dopant is selected from an inorganic solid electrolyte, a passive ceramic material, such as a non-electrolyte oxide, an electrically conductive material or a combinations thereof.

When the second dopant is the passive ceramic material (not an electrolyte), the amount of the usage of the polymer base materials and the additives can be reduced, and the film-forming ability can also be improved to serve as a film-forming enhancer. The passive ceramic material may be, for example, the silicon dioxide. When the second dopant is the nanometer-scaled inorganic solid electrolyte, excepting for reducing the amount of the usage of the polymer base materials and the additives, the second dopant can provide a high-speed ion conduction path. The inorganic solid electrolyte may be, for example, an oxide-based solid electrolyte, a sulfide-based solid electrolyte or other inorganic solid electrolytes. For example, when the ions are transmitted in the contact surface adjusting material, the ions can transfer by the contact surface adjusting material directly, or the ions can transfer by the nanometer-scaled inorganic solid electrolyte when contacting. When the second dopant is the electrically conductive material, the conductivity can be improved, especially when applied to the electrode layer.

Besides, the fluidity of the polymer base material is improved by adding the additive. The polymer base material would have higher ion conductivity and poorer mechanical properties at room temperature to fill between the solid electrolyte particles or the solid electrolyte particles and particles with another material to achieve the surface-to-surface, not point-to-point, or the approximate impregnation coating type contact. Therefore, the interface resistance of the solid electrolytes can be decreased. Moreover, the additive, such as ionic liquids, is non-volatile. There will be no occurred the problems of generating flammable gas. And, the contact surface adjusting material will not cause size shrinkage and drop of ions conductivity by volatilizing of the added additive during the drying process.

Please refer to FIG. 1A, which shows one embodiment of the composite electrolyte system constructed by the contact surface adjusting material for solid electrolytes of this invention. As shown, the composite electrolyte system 1 includes a first particle 11, which is a first inorganic solid electrolyte, a second particle 12, which is selected from a second inorganic solid electrolyte, a passive ceramic material or an active material; and a bridging portion 13, which is located between the first particle 11 and the second particle 12 and is composed of the contact surface adjusting material for solid electrolytes and is used to adhere the first particle 11 and the second particle 12 to form a face-to-face ion transmission path. As above-mentioned, the fluidity of the polymer base material is improved by adding the additive, such as the ionic liquid. The polymer base material would have higher ion conductivity and poorer mechanical properties at room temperature to fill between the first particle 11 and the second particle 12. Therefore, the inorganic solid electrolyte (the first particle 11) and another particle (the surface of the solid electrolyte or the active material) would achieve the surface-to-surface or the approximate impregnation coating type contact, instead of the conventional point-to-point contact to transmit ions between the solid electrolyte particles to another particles. Therefore, the interface resistance of the solid electrolytes can be decreased. The above inorganic solid electrolyte may be, for example, an oxide-based solid electrolyte, a sulfide-based solid electrolyte or other inorganic solid electrolytes.

Figure 1B:
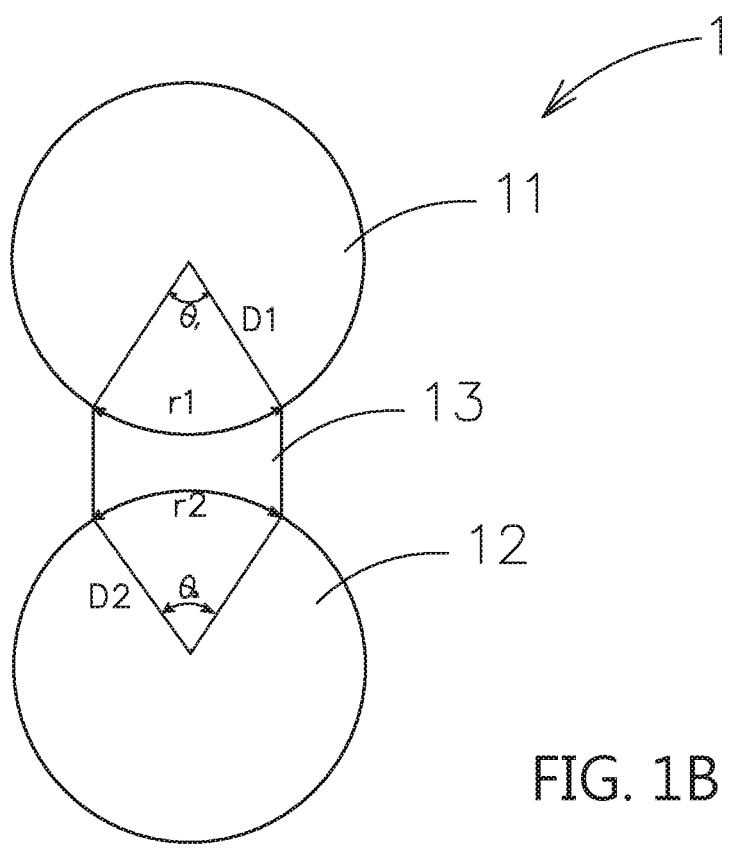
FIG. 1B is a schematic diagram of the contact surface between the bridging portion and the inorganic solid electrolyte of this invention.

The surface-to-surface or the approximate impregnation coating type contact of the invention is shown in FIG. 1B. For example, the first particle 11 is sphere with radius D1 and the second particle 12 is sphere with radius D2. The contact between the bridging portion 13 and the first particle 11 is the arc length r1 with a central angle θ1. Therefore, the arc length r1 would be $2\pi D1*\theta1/360$, $0<\theta1<90$. The contact between the bridging portion 13 and the second particle 12 is the arc length r2 with a central angle θ2. Therefore, the arc length r2 would be $2\eta D2*\theta2/360$, $0<\theta2<90$. The effective contact lengths for ions transmission of first particle 11 and the second particle 12 are the arc lengths r1, r2. However, the conventional contact to transmit ions between the solid electrolyte particles to another particles are point-to-point contact, i.e. arc length $r\approx 0(\theta\approx 0)$.

Excepting for ions transmission, the above polymer base material of the composite electrolyte system acts as the adhesive and the film former to adhere the first particle 11 and the second particle 12.

Figure 1C:
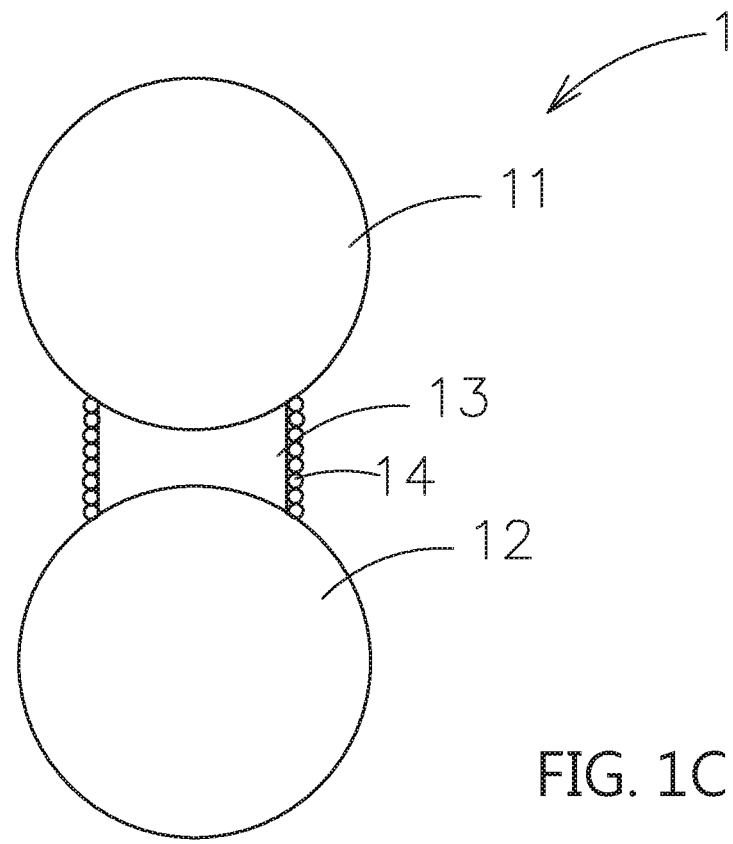
FIGS. 1C-1G are schematic diagrams of the different embodiments of the composite electrolyte system of this invention.
Figure 1D:
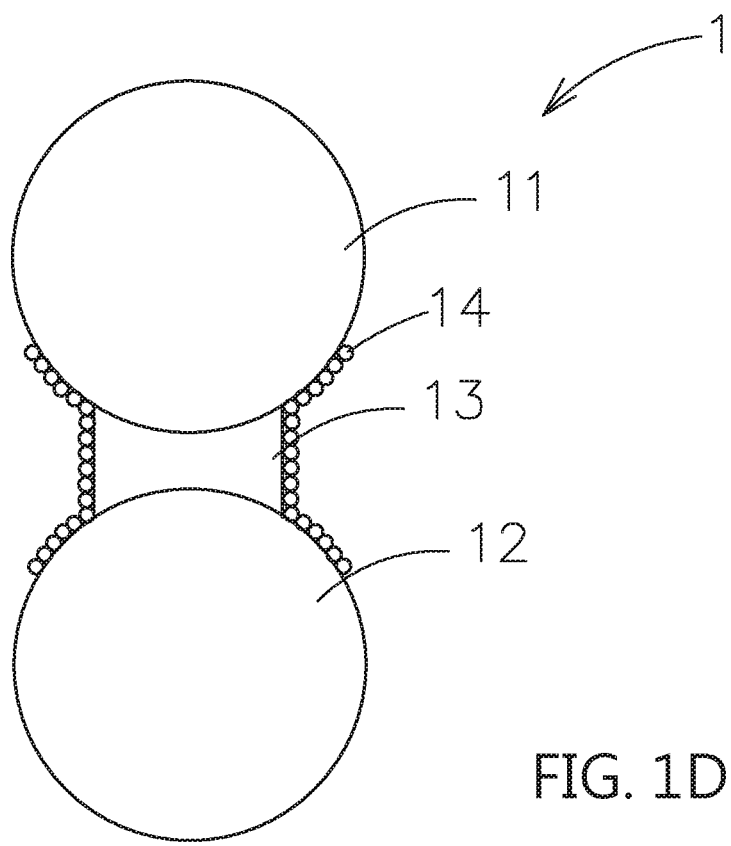

Please refer to FIG. 1C, which shows another embodiment of this invention. As shown, the surfaces of the bridging portion 13, which are not in contact with the first particle 11 and the second particle 12, further includes a plurality of first dopant 14. The first dopant 14 is selected from a three inorganic solid electrolyte with a diameter smaller than the diameters of the first particle 11 and the second particle 12, or a passive ceramic material, i.e. non-oxide electrolytes, to enhance the film forming. Further, the first dopant 14 may extend to deposit on the outer surfaces of the first particle 11 and the second particle 12, as shown in FIG. 1D. Moreover, the first dopants 14 may only deposit on the outer surface of the first particle 11 or the second particle 12. When the second particle 12 is the active material, the first dopant 14 may be an electrically conductive material, which is selected from a graphite, an acetylene black, a carbon black, a carbon nanotube, a carbon fiber, a graphene or a combinations thereof.

Figure 1E:
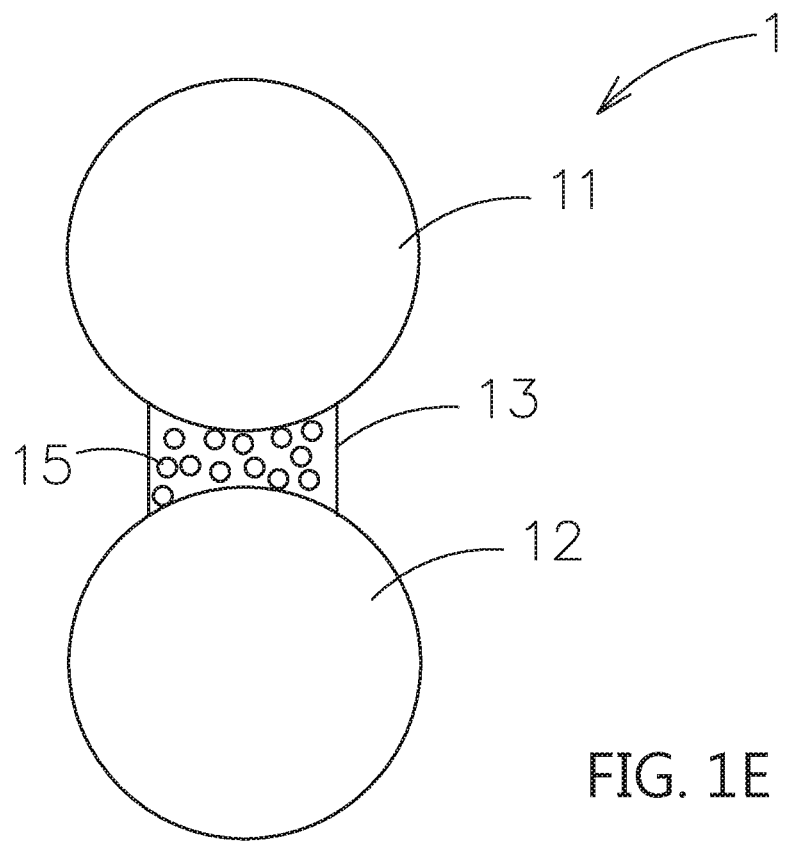

Please refer to FIG. 1E, which shows another embodiment of this invention. As shown, the bridging portion 13 further includes a second dopant 15 with nanometer scale. The second dopant 15 is selected from an inorganic solid electrolyte, a passive ceramic material or a combinations thereof. The functions of the mixed second dopant 15 are substantially the same as the above embodiments, and thus the repeated description is omitted for clarity. Also, when the second particle 12 is the active material, the second dopant 15 may be an electrically conductive material or further mixing with nanometer scaled particles, such as an oxide or a solid electrolyte. The electrically conductive material is selected from a graphite, an acetylene black, a carbon black, a carbon nanotube, a carbon fiber, a graphene or a combinations thereof.

Figure 1F:
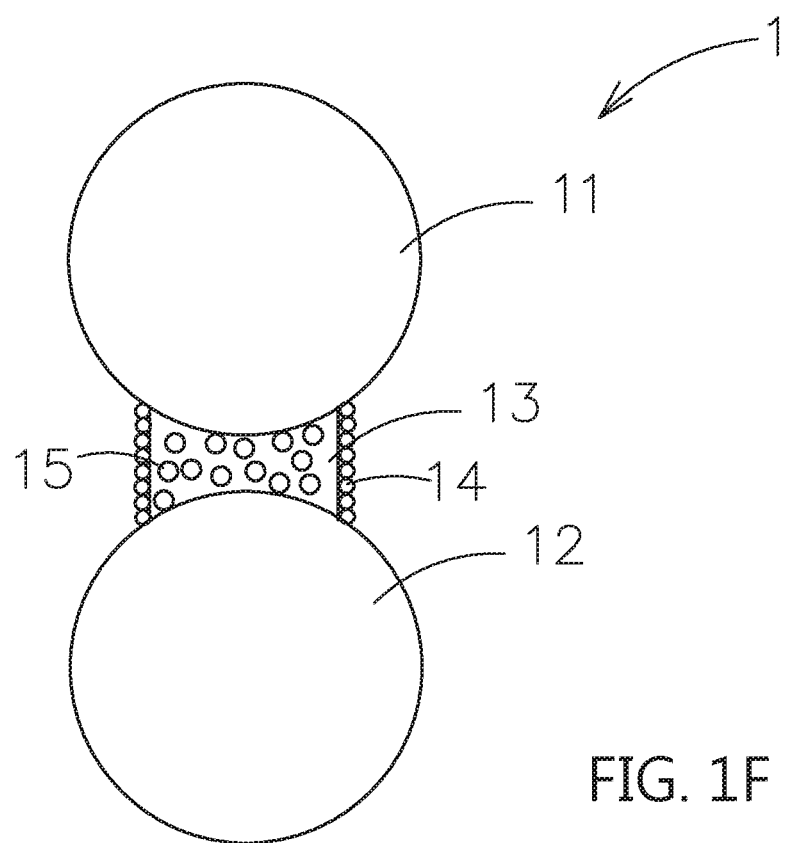

The embodiment in which the second dopant 15 is mixed in the bridging portion 13 can be combined with the above-mentioned embodiment in FIG. 1C or FIG. 1D. For example, as shown in FIG. 1F, the second dopant 15 is mixed in the bridging portion 13 and the surfaces of the bridging portion 13, which are not in contact with the first particle 11 and the second particle 12, includes a plurality of first dopants 14.

In the subsequent embodiments, the components with the same structure, material or characteristics will be denoted with the same name and number.

Please refer to FIG. 2A, which shows another embodiment of the composite electrolyte system constructed by the contact surface adjusting material for solid electrolytes of this invention. As shown, the composite electrolyte system 2 includes a first particle 11, which is a first inorganic solid electrolyte, a second particle 12, which is selected from a second inorganic solid electrolyte, a passive ceramic material or an active material, and a first shell layer 21, which covers an outer surface of the first particle 11. The first shell layer 21 composed of the contact surface adjusting material for solid electrolytes is used to adhere the first particle 11 and the second particle 12 to form a non-single point ion transmission path. As shown in FIG. 2I which is a partial enlarged view of FIG. 2A, based on the contact surface adjusting material has poorer mechanical property, the adhered place of the second particle 12 and the first shell layer 21 is performed in the surface-to-surface or the approximate impregnation coating type contact way instated of point to point. In the subsequent description, the components formed by the contact surface adjusting material will be the same impregnation coating type contact when touching to another substance (particle) with hard surface or fixed-shaped appearance.

Figure 2C:
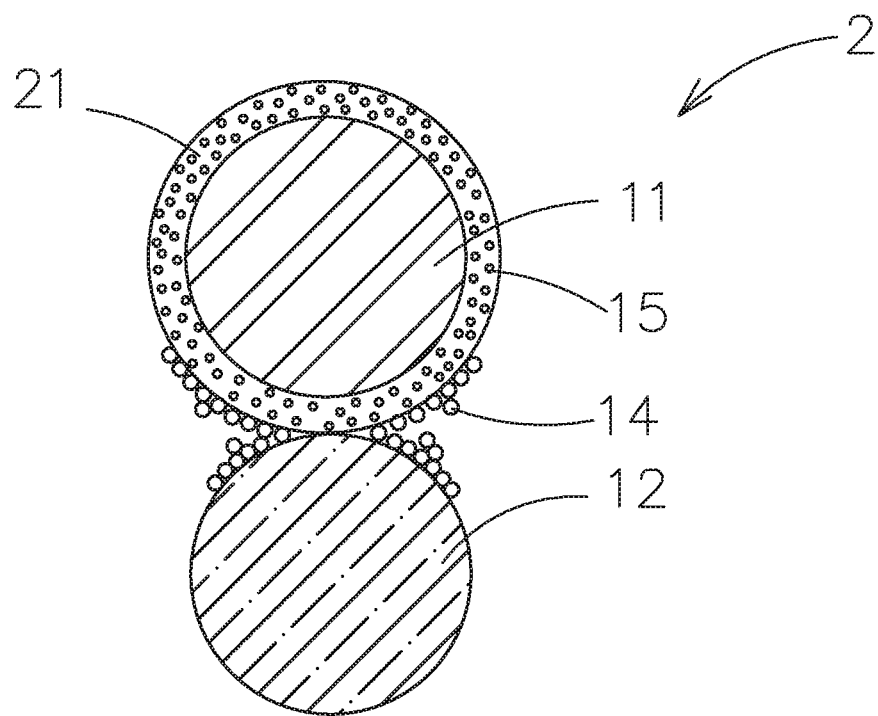

Please refer to FIG. 2B, comparing to the embodiment in FIG. 2A, the outer surface of the first shell layer 21 further includes a plurality of first dopants 14, and further extended to deposit on the outer surface of the second particle 12. Besides, one of the outer surface of the first shell layer 21 or the second particle 12 may include the plurality of first dopants 14. Please refer to FIG. 2C, comparing to the embodiment in FIG. 2B, the second dopant 15 is mixed in the first shell layer 21. Please refer to FIG. 2D, a second shell layer 22 is formed on the outer surface of the second particle 12. The second shell layer 22 is also composed of the contact surface adjusting material for solid electrolytes.

Figure 2D:
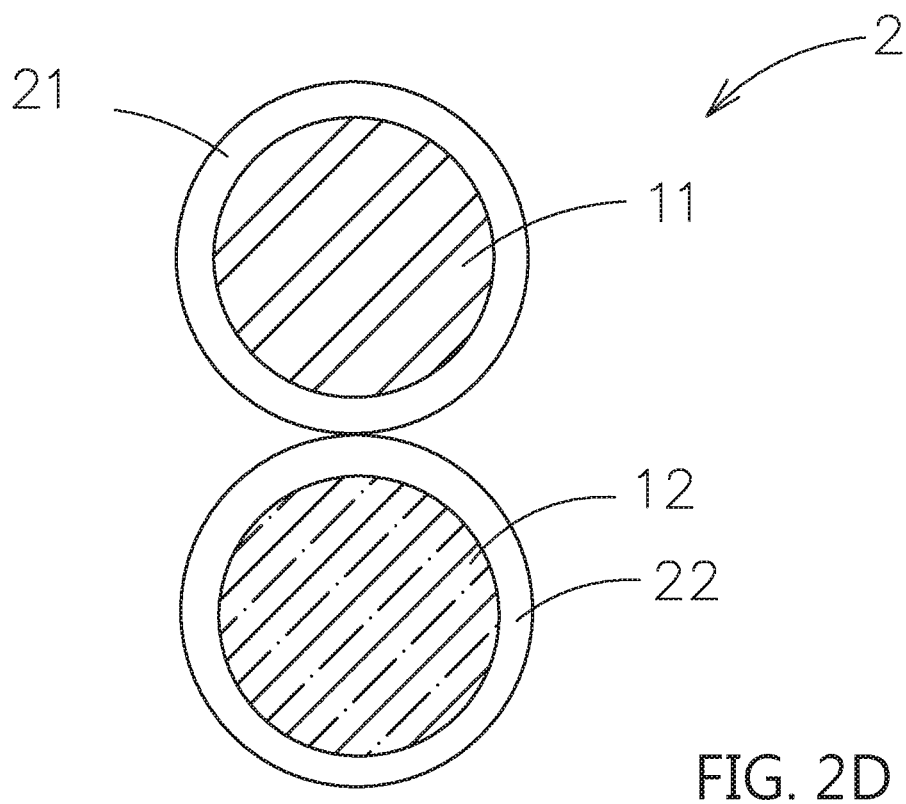
Figure 2E:
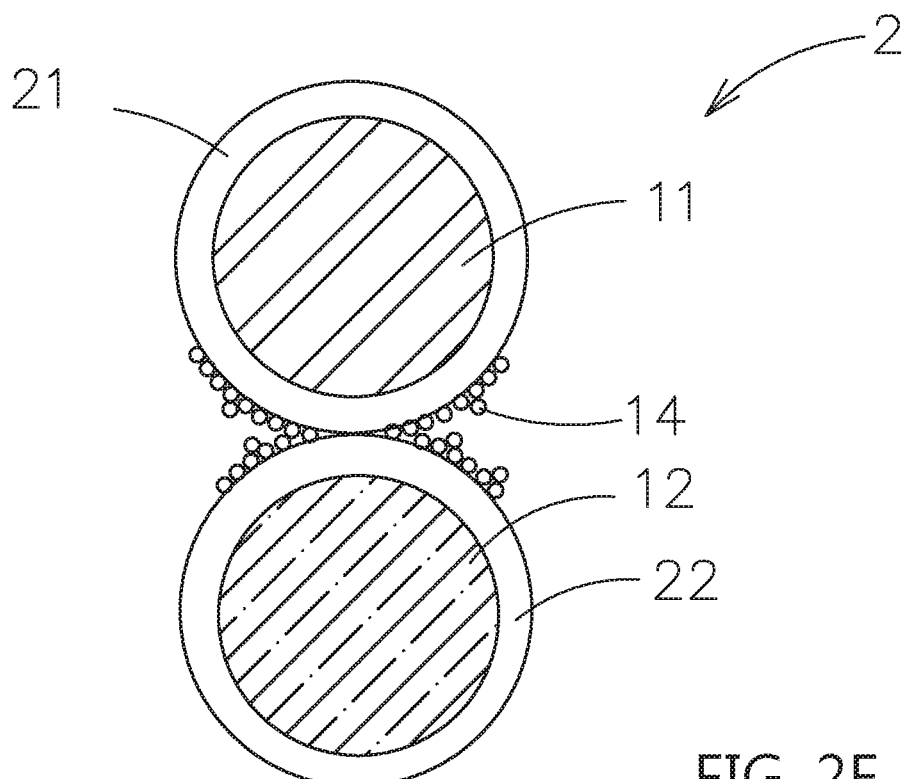
Figure 2F:
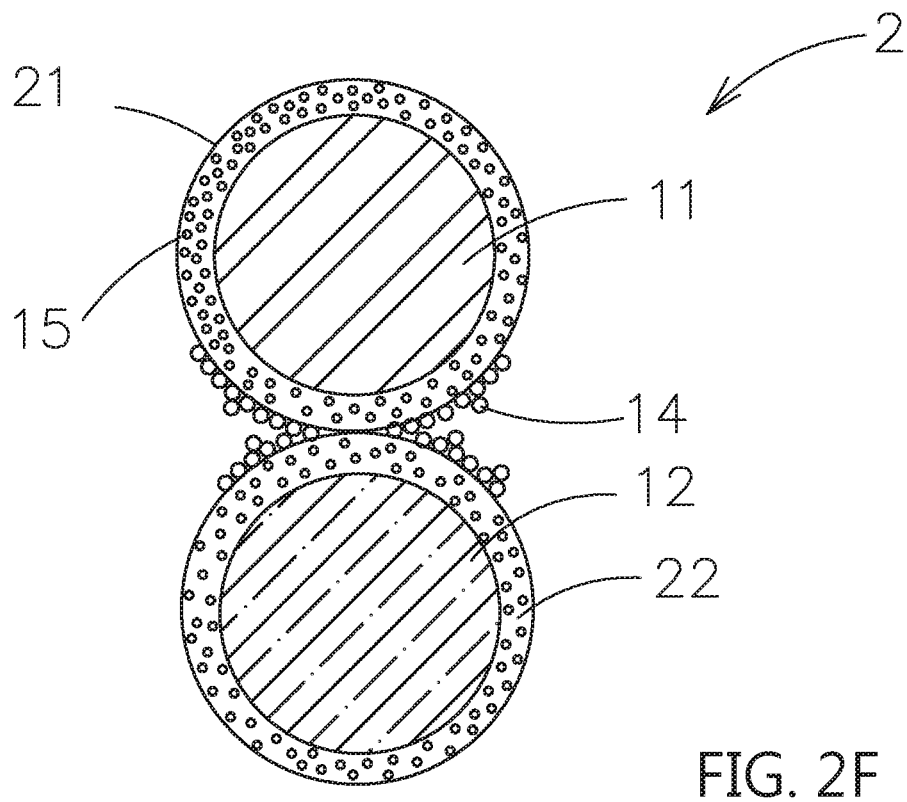

Please refer to FIG. 2E, comparing to the embodiment in FIG. 2D, are the outer surface of the first shell layer 21 and the second shell layer 22 further include a plurality of first dopants 14. Besides, one of the outer surface of the first shell layer 21 or the second shell layer 22 may include the plurality of first dopants 14. Please refer to FIG. 2F, comparing to the embodiment in FIG. 2E, the second dopant 15 is mixed in the first shell layer 21 and the second shell layer 22. Moreover, the second dopant 15 may only mix in the first shell layer 21 or in the second shell layer 22.

Figure 3A:
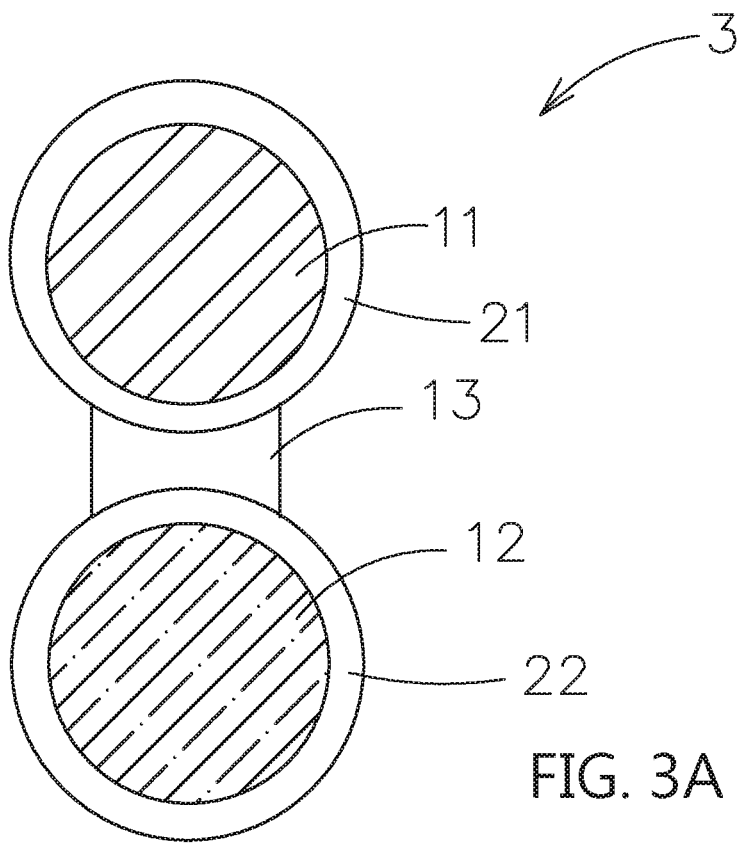
FIGS. 3A-3F are schematic diagrams of the different embodiments of the composite electrolyte system of this invention.

Please refer to FIG. 3A, which shows another embodiment of the composite electrolyte system constructed by the contact surface adjusting material for solid electrolytes of this invention. As shown, the composite electrolyte system 3 includes a first particle 11, which is a first inorganic solid electrolyte, a second particle 12, which is selected from a second inorganic solid electrolyte, or an active material, a first shell layer 21, which covers an outer surface of the first particle 11, a second shell layer 22, which covers an outer surface of the second particle 12, and a bridging portion 13, which is located between the first shell layer 21 and the second shell layer 22 and adhered therebetween. The first shell layer 21, the second shell layer 22 and the bridging portion 13 composed of a contact surface adjusting material for solid electrolytes are used to form an ion transmission path of surface to surface contacting type of the first particle 11 and the second particle 12.

Figure 3B:
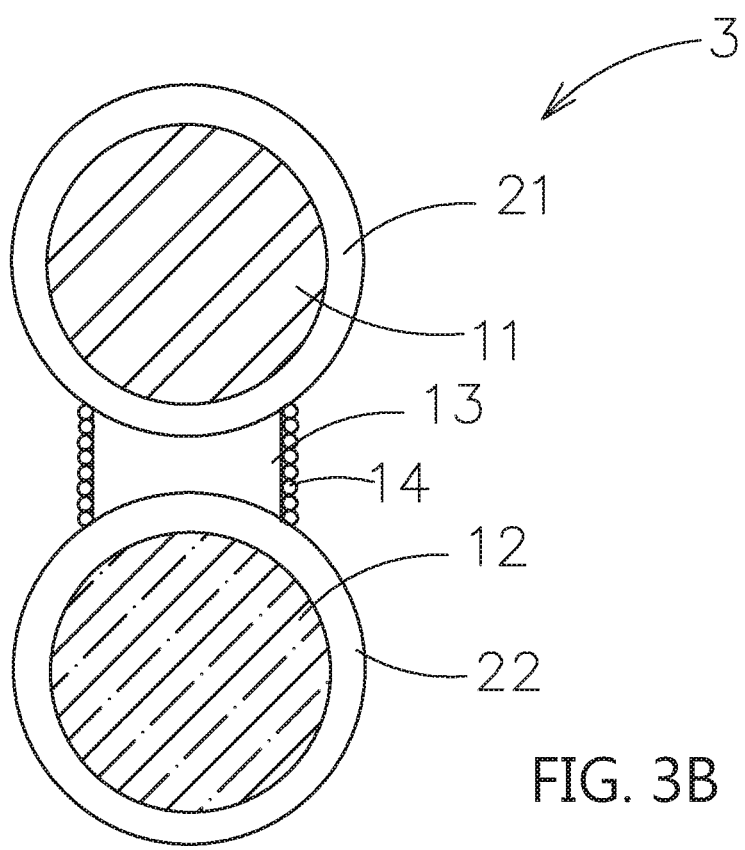
Figure 3C:
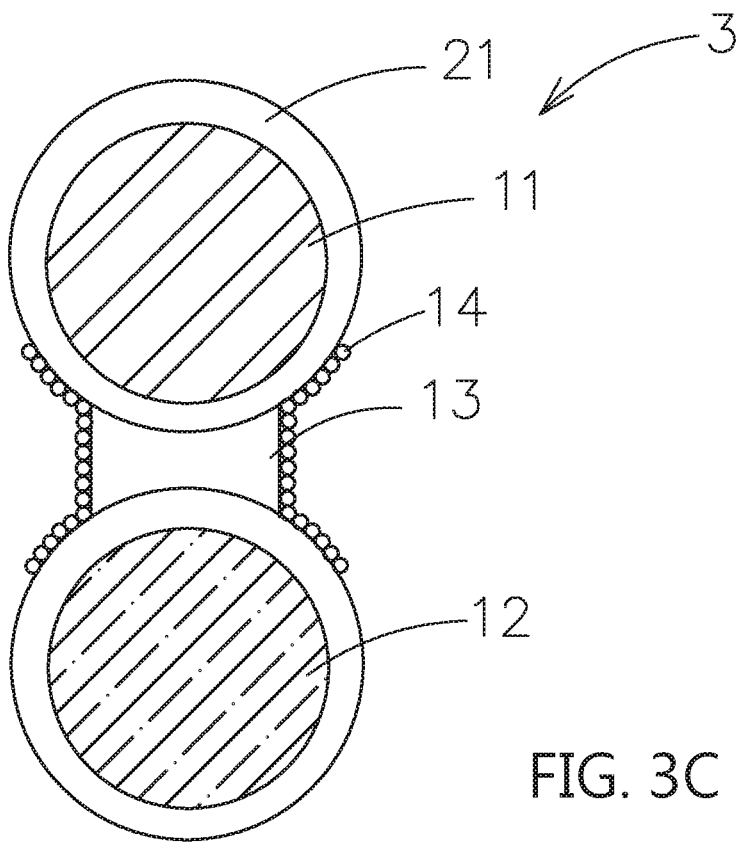

Please refer to FIG. 3B, comparing to the embodiment in FIG. 3A, the plurality of first dopants 14 are included in the outer surfaces of the bridging portion 13, which are not in contact with the first shell layer 21 and the second shell layer 22. Please refer to FIG. 3C, comparing to the embodiment in FIG. 3B, the plurality of first dopant 14 are further extended to the outer surfaces of the first shell layer 21 and the second shell layer 22. Moreover, the plurality of first dopant 14 may further be extended on the outer surfaces of the first shell layer 21 or on the second shell layer 22.

Figure 3D:
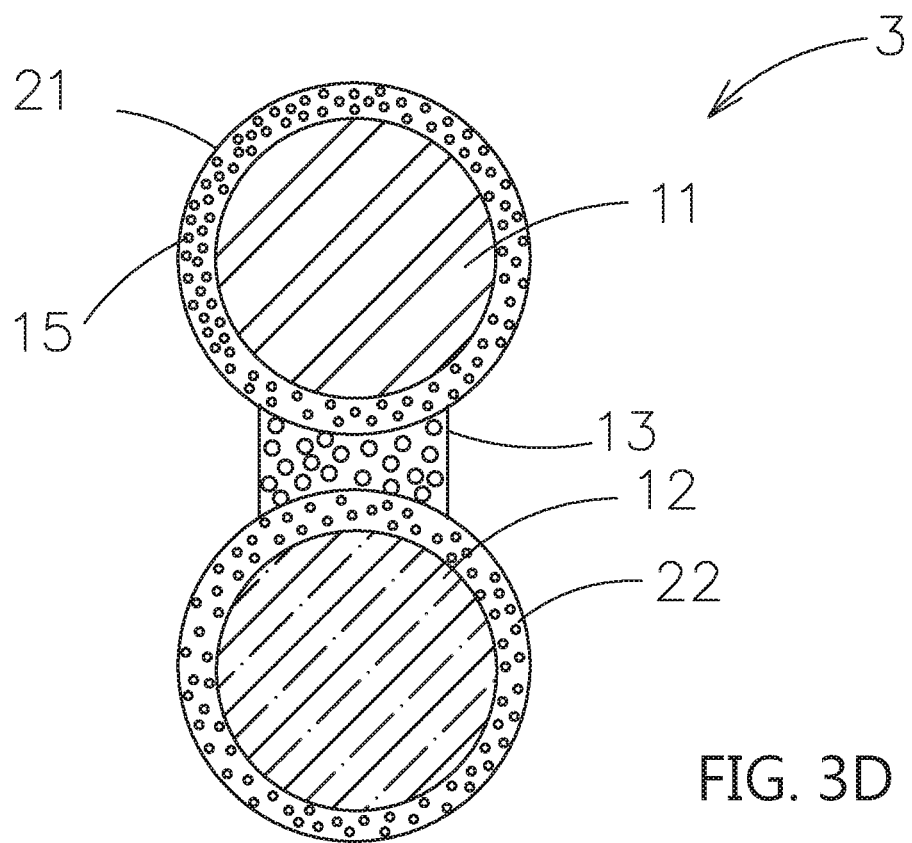

Please refer to FIG. 3D, comparing to the embodiment in FIG. 3A, the second dopant 15 is mixed in the first shell layer 21, the second shell layer 22 and the bridging portion 13.

Figure 3E:
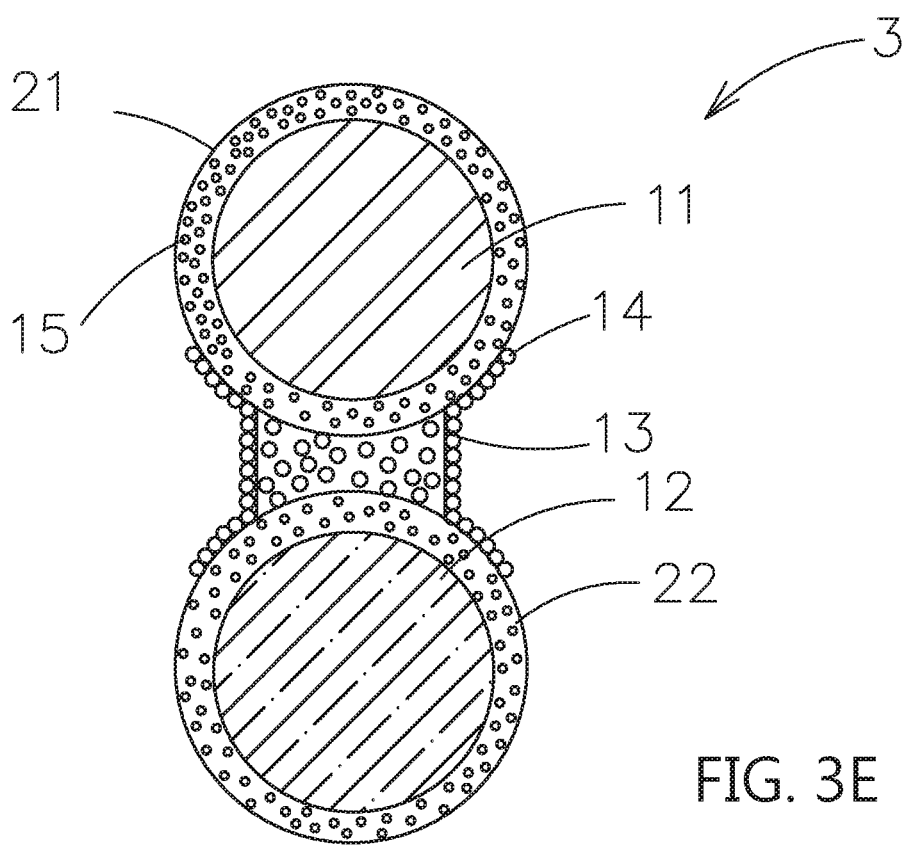

Please refer to FIG. 3E, comparing to the embodiment in FIG. 3D, the first dopant 14 is further extended to the outer surfaces of the first shell layer 21 and the second shell layer 22. Moreover, the plurality of first dopant 14 may further be extended on the outer surfaces of the first shell layer 21 or on the second shell layer 22.

Figure 1G:
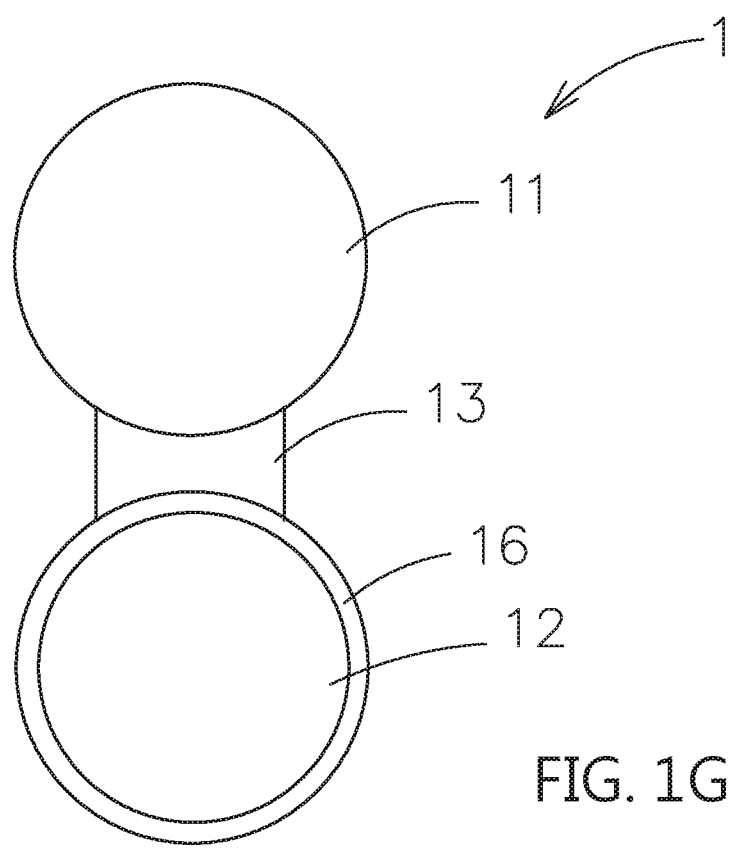
Figure 2G:
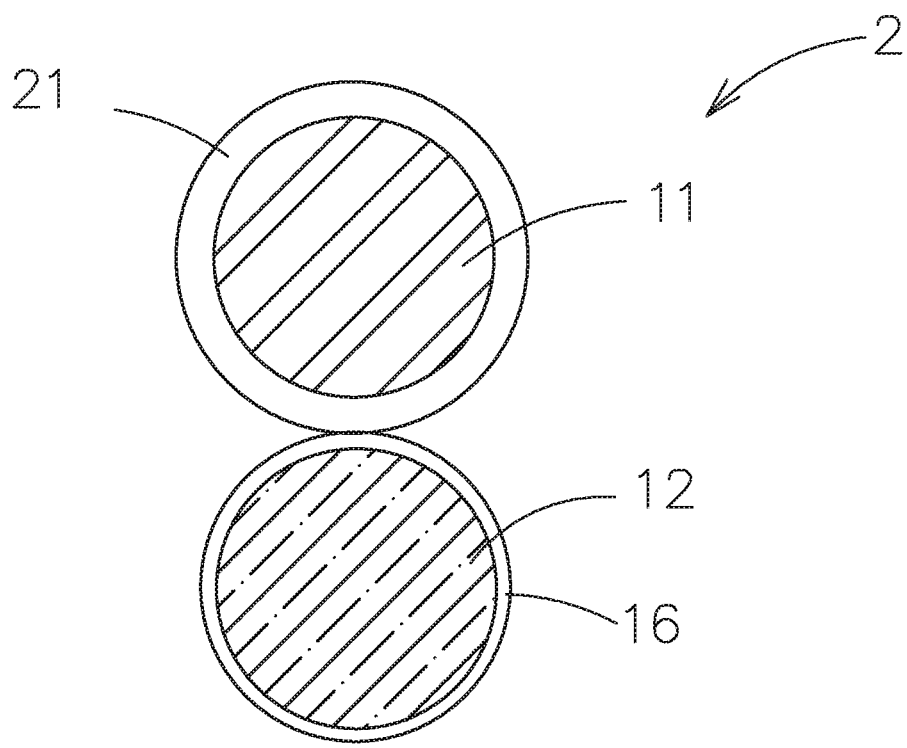
Figure 2H:
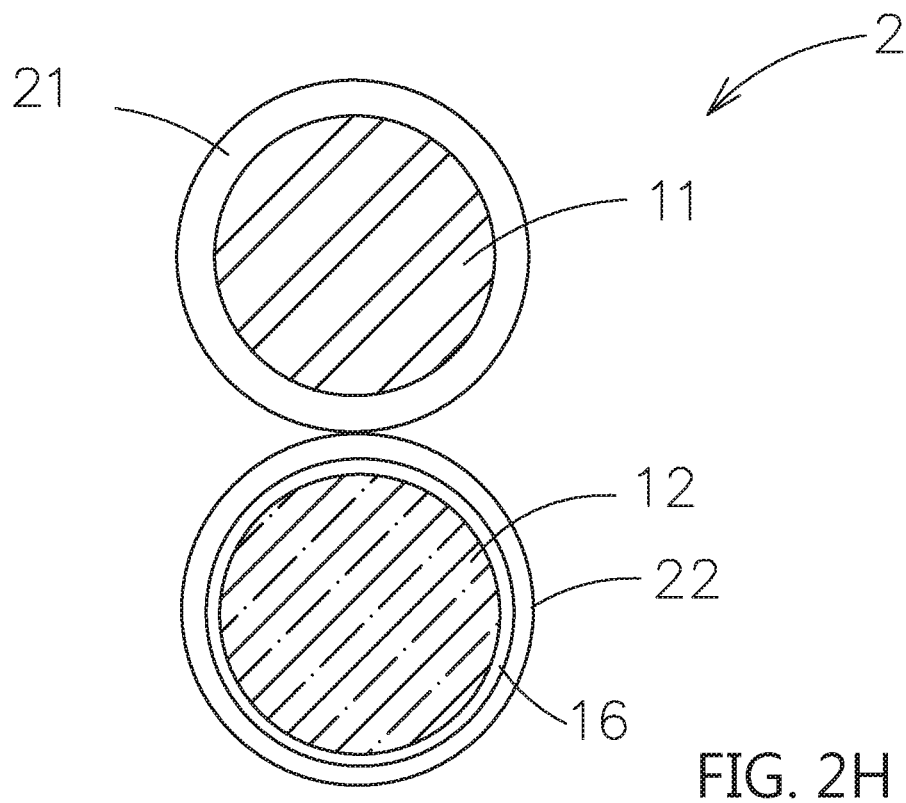
Figure 3F:
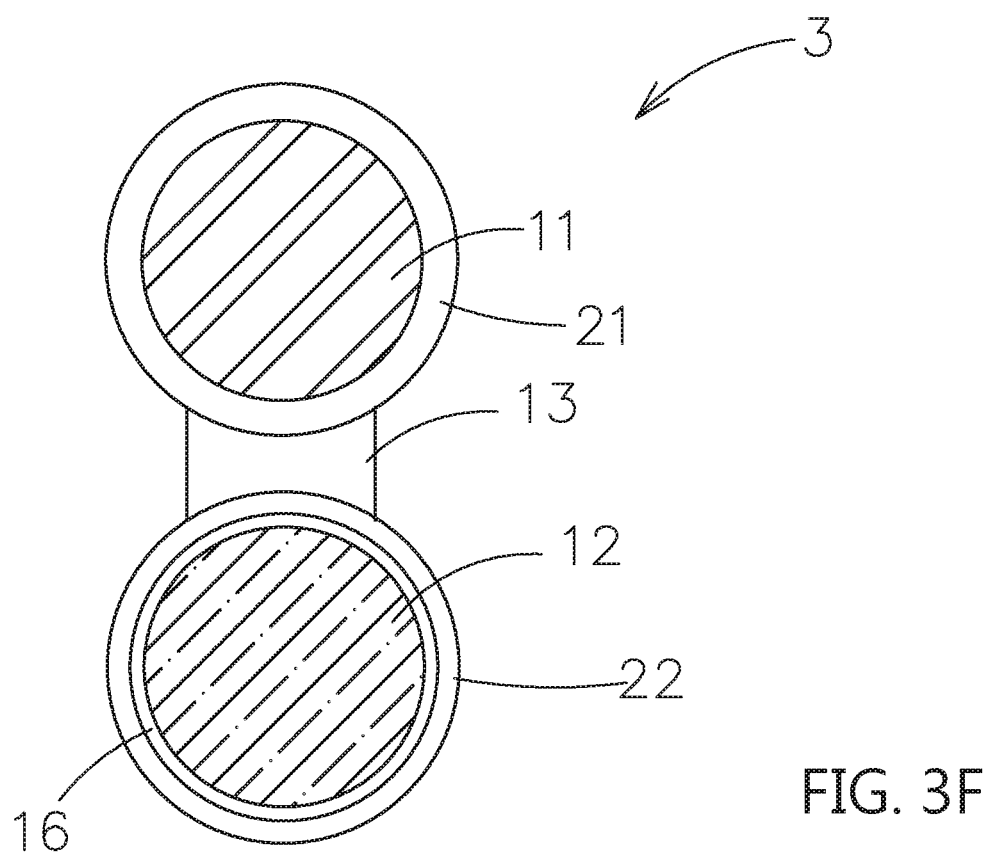

In the above embodiments, when the second particle 12 is the active material, the composite electrolyte system can be applied to the electrode layer. An artificial passive film can be formed on the surface of the second particle 12 to avoid the degradation in structure occurred as the electrolyte (contact surface adjusting material) contacting to the active material, and the resulting decreased in surface conductivity and the rate of the lithium ions passing through the surface layer. For example, please refer to FIG. 1G, the second particle 12 may further have an artificial passive film 16 on its surface. Or please refer to FIG. 2G, FIG. 2H and FIG. 3F, the second particle 12 may further have an artificial passive film 16 on its surface. The artificial passive film 16 is located between the second particle 12 and the second shell layer 22, as shown in FIG. 2H and FIG. 3F. The artificial passive film 16 is used to efficiently reduce or prevent the contact surface adjusting material to overly contact with the second particle 12. The material of the artificial passive film 16 can be non-solid electrolyte series or solid electrolyte series based on the ions transferring or not. The thickness of the artificial passive film 16 is substantially less than 100 nanometers. The non-solid electrolyte series may be selected from an electrically conductive material, a lithium-free ceramic material and a combinations thereof. The lithium-free ceramic material may include a zirconia, a silica, an alumina, a titanium oxide or a gallium oxide.

When the second particle 12 is the inorganic solid electrolyte or the passive ceramic material, the composite electrolyte system can be applied to the separator. And it is necessary for the composite electrolyte system to have an ion supplying material, such as salts. Also, when the first particle 11 and the second particle 12 are both inorganic solid electrolytes and do not have a shell layer structure, the first particle 11 and the second particle 12 must be selected according to the polarity of the battery element. For example, when the composite electrolyte system is applied in the positive electrode, the first particle 11 and the second particle 12 may be selected LATP($Li_{1+x}Al_xTi_{2-x}(PO_4)_3$) or LLZO (lithium lanthanum zirconium oxide, $Li_7La_3Zr_2O_{12}$). When the composite electrolyte system is applied in the negative electrode, the first particle 11 and the second particle 12 may only be the LLZO to avoid the reduction reaction when LATP containing titanium is used in the negative electrode. However, when the first particle 11 and the second particle 12 both have the shell layer structure, there do not necessary to select the type of the used solid electrolytes according to the polarity (positive or negative). That is to say, both the first particle 11 and the second particle 12 can be selected the LATP with lower cost and applied to the positive and negative electrodes.

Accordingly, the first dopant 14 of the present invention can be selected from three types. The first type is the solid electrolyte, and the particle size is smaller than the sizes of the first particle 11 and the second particle 12. The second type is the passive ceramic material. The amount of the usage of the contact surface adjusting material can be reduced, and can serve as a film-forming enhancer. The third type is the electrically conductive material, which is mainly used in the electrode layer. The first type and the second type are applicable to both electrode layers and the separator.

The particle sizes or diameters of the second dopant 15 of the present invention is nanometer scale, and can also be selected from three types. The first type is the solid electrolyte. The second type is the passive ceramic material. The amount of the usage of the contact surface adjusting material can be reduced, and can serve as a film-forming enhancer. The third type is the electrically conductive material, which is mainly used in the electrode layer. The first type and the second type are applicable to both electrode layers and the separator.

For example, when the second particle 12 is the active material, the nanometer scaled second dopant 15 mixed or filled with the contact surface adjusting material (as the bridging portion and/or the shell layer) may be the solid electrolyte, the passive ceramic material, the electrically conductive material or a combinations thereof. Similarly, when the second particle 12 is the active material, the surface of the first particle 11, the second particle 12, or any surface of the first shell layer 21, the second shell layer 22, and the bridging portion 13 may include the first dopant 14. The first dopant 14 may be the solid electrolyte, the passive ceramic material, the electrically conductive material or a combinations thereof.

Figure 4:
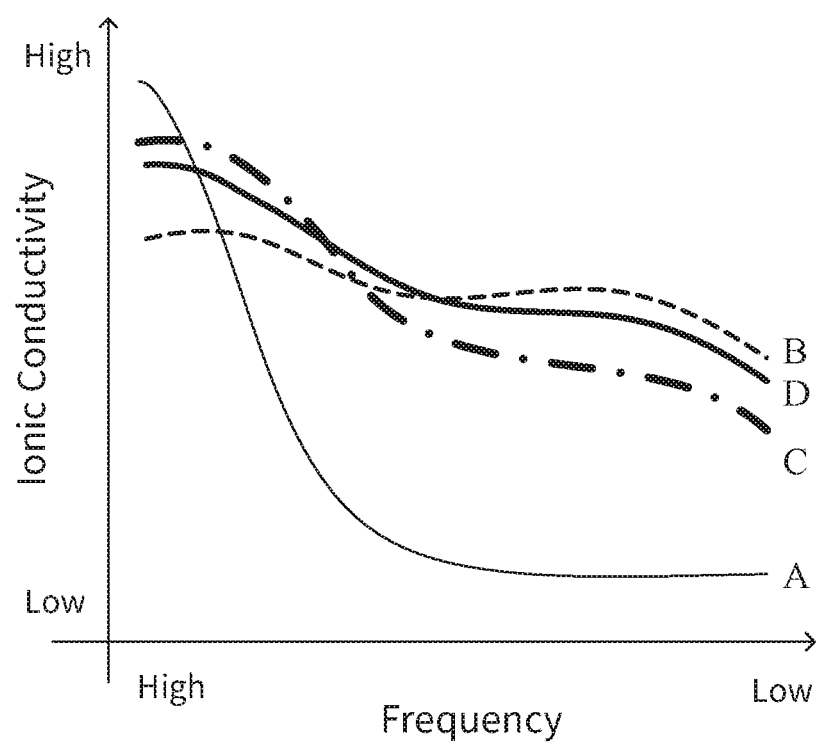
FIG. 4 is a schematic diagram of the relationship between ionic conductivity and frequency of different materials.

Please refer to FIG. 4, which is a characteristics chart of the ion conductivity of the contact surface adjusting material of the present invention and the solid electrolyte, LATP, at low and high frequencies. In this diagram, the curve A represents LATP and the curve B represents the contact surface adjusting material without the ion supplying material of the present invention. The curve C represents the composite electrolyte system containing the contact surface adjusting material of the present invention, which can be regarded as a mixture of 70% A and 30% B by weight. It does not contain the ion supplying material, and LATP is equivalent to the above-mentioned first particle. The curve D is the composition of curve C with lithium ions added. It can be seen from the diagram that in the high frequency area, the oxide solid electrolyte LATP has better ionic conductivity. Therefore, in the high frequency state, the movement of the ions tends to be mainly in the homogeneous structure of the oxide solid electrolyte. The homogeneous structure generally refers to the homogeneous structure of the crystal, the glass or the solid solution. On the other hand, in the middle and low frequency range, the contact surface adjusting material of the present invention without ion supplying material has better performance Therefore, it can be seen that in the middle and low frequency range, the movement of ions is mainly the solid-to-solid interface (different phases or materials). The contact surface adjusting material of the present invention has a better surface-to-surface contact mode (approximate impregnation coating type) to have better performance Therefore, the composite electrolyte system of the present invention adopts the compositions of the curve A and the curve B to be mixed in a specific ratio. As shown in the diagram, the ion conductivity characteristics (the curve C or D) can reach the best performance in both low frequency and high frequency.

In addition, according to the curve C in FIG. 4, the volume percentage of the contact surface adjusting material is A0 and the volume percentage of the solid electrolyte is B0 (A0+B0≈100, A0 is 30-40, and B0 is 70-60) to obtain the composite solid electrolyte system (when the second dopant 15 is a solid electrolyte, it is also included in the percentage B). If the contact surface adjusting material is used to contact the active material in the electrode layer, the volume percentage of the contact surface adjusting material and the solid electrolyte in the composite electrolyte system can be appropriately adjusted as A1 and B1 (A1+B1=100, 50<A1<100). On the other hand, if the composite electrolyte system is far away from the active material, the volume percentage of the contact surface adjusting material and the solid electrolyte in the composite electrolyte system can be appropriately adjusted as A2 and B2 (A2+B2=100, 50<B2<100). In this way, it will be able to comply with requirements at the low-frequency. And the high-frequency conductivity demand is located far away from the active material, so a higher percentage of the solid electrolyte is used. That is to say, with the distance from the outer surface of the active material from close to far, the contact surface adjusting material in the composite electrolyte system exhibits a high to low volume percentage distribution.

In other words, a battery composed of this composite electrolyte system includes an active material layer and a separator. When the composite electrolyte system is applied to the separator, the volume content of the contact surface adjusting material is smaller than the volume content of the solid electrolyte in the composite electrolyte system. When the composite electrolyte system is applied to the active material layer, the closer to the surface of the active material is, the higher the volume content of the contact surface adjusting material compared to the volume content of the solid electrolyte in the composite electrolyte system is.

Accordingly, the present invention provides a brand new contact surface adjusting material for solid electrolytes and the composite electrolyte system thereof to be adapted for an electrochemical system, such as a lithium ion secondary battery. The contact surface adjusting material mainly includes a polymer base material and an additive mixed together therein. The polymer base material is capable of allowing metal ions to move inside and the additive is capable of dissociating metal salts and is served as a plasticizer. The contact between the oxide solid electrolyte and another particle material is the surface-to-surface or the approximate impregnation coating type. Therefore, the problem of the high interface resistance for the oxide solid electrolyte is overcome.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A composite electrolyte system, comprising:
   a first particle, being a first inorganic solid electrolyte;
   a second particle, selected from a second inorganic solid electrolyte, a passive ceramic material or an active material; and
   a bridging portion, located between the first particle and the second particle and composed of a contact surface adjusting material for solid electrolytes and used to adhere the first particle and the second particle to form an ion transmission path therebetween, wherein the contact surface adjusting material comprises a polymer base material and an additive mixed together therein, the polymer base material is configured to allow metal ions to move inside, and the additive is configured to dissociate metal salts and is a plasticizer.

2. The composite electrolyte system of claim 1, wherein the contact surface adjusting material further comprises a crystal growth inhibiting material and/or an ion supplying material.

3. The composite electrolyte system of claim 1, wherein the contact surface adjusting material further comprises a second dopant with nanometer scale, when the second particle is selected from the second inorganic solid electrolyte or the passive ceramic material, the second dopant is selected from an inorganic solid electrolyte, a passive ceramic material or a combinations thereof; and when the second particle is the active material, the second dopant is selected from an inorganic solid electrolyte, a passive ceramic material, an electrically conductive material or a combinations thereof.

4. The composite electrolyte system of claim 1, wherein surfaces of the bridging portion, which are not in contact with the first particle and the second particle, include a plurality of first dopants, when the second particle is selected from the second inorganic solid electrolyte or the passive ceramic material, the first dopant is selected from an inorganic solid electrolyte, a passive ceramic material or a combinations thereof; and when the second particle is the active material, the first dopant is selected from an inorganic solid electrolyte, a passive ceramic material, an electrically conductive material or a combinations thereof.

5. The composite electrolyte system of claim 4, wherein the first dopant is further extended to deposit on an outer surface of the first particle and/or the second particle.

6. The composite electrolyte system of claim 1, wherein when the second particle is the active material, the second particle further includes an artificial passive film disposed on an outer surface of the second particle.

7. The composite electrolyte system of claim 4, wherein the polymer base material is selected from a polyethylene oxide (PEO), a poly(ethylene glycol)diacrylate (PEGDA), a poly(ethylene glycol)dimethacrylate (PEGDMA), a poly(ethylene glycol) monomethylether (PEGME), a poly(ethylene glycol) dimethylether (PEGDME), a poly[ethylene oxide-co-2-(2-methoxyethoxy)ethyl glycidyl ether] (PEO/MEEGE), a hyperbranched polymer, or a polynitrile; and wherein the additive is a plastic crystal electrolytes (PCEs) or an ionic liquid.

8. A composite electrolyte system, comprising:
a first particle, being a first inorganic solid electrolyte;
a second particle, selected from a second inorganic solid electrolyte, a passive ceramic material or an active material; and
a first shell layer, covering an outer surface of the first particle;
wherein the first shell layer is composed of a contact surface adjusting material for solid electrolytes and is used to adhere the first particle and the second particle to form an ion transmission path therebetween, wherein the contact surface adjusting material comprises a polymer base material and an additive mixed together therein, the polymer base material is configured to allow metal ions to move inside, and the additive is configured to dissociate metal salts and is a plasticizer.

9. The composite electrolyte system of claim 8, wherein the contact surface adjusting material further comprises a crystal growth inhibiting material and/or an ion supplying material.

10. The composite electrolyte system of claim 8, wherein the contact surface adjusting material further comprises a second dopant with nanometer scale, when the second particle is selected from the second inorganic solid electrolyte or the passive ceramic material, the second dopant is selected from an inorganic solid electrolyte, a passive ceramic material or a combinations thereof; and when the second particle is the active material, the second dopant is selected from an inorganic solid electrolyte, a passive ceramic material, an electrically conductive material or a combinations thereof.

11. The composite electrolyte system of claim 8, wherein an outer surface of the first shell layer further includes a plurality of first dopants, when the second particle is selected from the second inorganic solid electrolyte or the passive ceramic material, the first dopant is selected from an inorganic solid electrolyte, a passive ceramic material or a combinations thereof; and when the second particle is the active material, and wherein when the second particle is the active material, the first dopant is selected from an inorganic solid electrolyte, a passive ceramic material, an electrically conductive material or a combinations thereof.

12. The composite electrolyte system of claim 8, wherein when the second particle is the active material, the second particle further includes an artificial passive film disposed on an outer surface of the second particle.

13. The composite electrolyte system of claim 8, further comprising a second shell layer covering an outer surface of the second particle, wherein the second shell layer is composed of the contact surface adjusting material for solid electrolytes.

14. The composite electrolyte system of claim 13, wherein an outer surface of the first shell layer and/or the second shell layer further includes a plurality of first dopants, when the second particle is selected from the second inorganic solid electrolyte or the passive ceramic material, the first dopant is selected from an inorganic solid electrolyte, a passive ceramic material or a combinations thereof; and when the second particle is the active material, and when the second particle is the active material, the first dopant is selected from an inorganic solid electrolyte, a passive ceramic material, an electrically conductive material or a combinations thereof.

15. The composite electrolyte system of claim 13, wherein when the second particle is the active material, the second particle further includes an artificial passive film disposed between the second particle and the second shell layer.

16. The composite electrolyte system of claim 13, further comprising a bridging portion, located between the first shell layer and the second shell layer and adhered therebetween, wherein the bridging portion is composed of the contact surface adjusting material for solid electrolytes.

17. The composite electrolyte system of claim 16, wherein one among of the outer surface of the first shell layer, the second shell layer and the bridging portion includes a plurality of first dopants, when the second particle is selected from the second inorganic solid electrolyte or the passive ceramic material, the first dopant is selected from an inorganic solid electrolyte, a passive ceramic material or a combinations thereof; and when the second particle is the active material, the first dopant is selected from an inorganic solid electrolyte, a passive ceramic material, an electrically conductive material or a combinations thereof.

18. The composite electrolyte system of claim 8, wherein the polymer base material is selected from a polyethylene oxide (PEO), a poly(ethylene glycol)diacrylate (PEGDA), a poly(ethylene glycol)dimethacrylate (PEGDMA), a poly(ethylene glycol) monomethylether (PEGME), a poly(ethylene glycol) dimethylether (PEGDME), a poly[ethylene oxide-co-2-(2-methoxyethoxy)ethyl glycidyl ether] (PEO/MEEGE), a hyperbranched polymer, or a polynitrile; and wherein the additive is a plastic crystal electrolytes (PCEs) or an ionic liquid.

* * * * *